(12) United States Patent
Koike et al.

(10) Patent No.: US 11,415,402 B2
(45) Date of Patent: Aug. 16, 2022

(54) MEASURING INSTRUMENT

(71) Applicant: FUJITSU COMPONENT LIMITED, Tokyo (JP)

(72) Inventors: Tamotsu Koike, Tokyo (JP); Katsuya Funakoshi, Tokyo (JP); Maiko Kikuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/701,610

(22) Filed: Dec. 3, 2019

(65) Prior Publication Data

US 2020/0208954 A1 Jul. 2, 2020

(30) Foreign Application Priority Data

Dec. 26, 2018 (JP) ............................. JP2018-243654

(51) Int. Cl.
*G01B 3/1061* (2020.01)
*G01B 3/1056* (2020.01)
*G01B 3/1043* (2020.01)
*G01B 3/1007* (2020.01)
*G01B 3/1005* (2020.01)

(52) U.S. Cl.
CPC ......... *G01B 3/1061* (2013.01); *G01B 3/1007* (2020.01); *G01B 3/1043* (2020.01); *G01B 3/1056* (2013.01); *G01B 2003/103* (2013.01); *G01B 2003/1015* (2013.01)

(58) Field of Classification Search
CPC .. G01B 3/1061; G01B 3/1056; G01B 3/1043; G01B 3/1007; G01B 2003/103; G01B 2003/1015; G01B 3/1069; G01B 2003/1012; G01B 3/1003; G01B 11/026;
(Continued)

(56) References Cited

U.S. PATENT DOCUMENTS 4,658,134 A * 4/1987 Okumura ............. G01B 3/1061
250/237 G
5,027,526 A * 7/1991 Crane ................... G01B 3/1061
33/763

(Continued)

FOREIGN PATENT DOCUMENTS

CN 205027223 2/2016
CN 205593439 9/2016
(Continued)

OTHER PUBLICATIONS

Notification of Reason for Refusal, dated Oct. 20, 2020, in Korean Application No. 10-2019-0146552 (8 pp.).
(Continued)

*Primary Examiner* — Yaritza Guadalupe-McCall
(74) *Attorney, Agent, or Firm* — Staas & Halsey LLP

(57) ABSTRACT

A measuring instrument that reads a measure including a plurality of reading patterns arranged in a length direction of the measure, each reading pattern including a plurality of patterns arranged in a width direction of the measure, includes: a flattening member that increases a flatness of the measure; and a first reader that optically reads the plurality of patterns arranged in the width direction included in a single reading pattern from the measure in a state where the flatness is increased by the flattening member.

9 Claims, 15 Drawing Sheets

(58) Field of Classification Search
CPC .......... G01D 5/24433; G01D 5/24471; G01D 5/34792
USPC .......................................................... 33/763
See application file for complete search history.

(56) References Cited

U.S. PATENT DOCUMENTS

| | | | | |
|---|---|---|---|---|
| 5,142,793 | A * | 9/1992 | Crane | G01B 3/1061 33/763 |
| 5,208,767 | A * | 5/1993 | George-Kelso | G01D 5/2495 377/18 |
| 5,426,863 | A * | 6/1995 | Biggel | G01B 3/1061 33/763 |
| 5,433,014 | A * | 7/1995 | Falk | G01B 3/1084 33/763 |
| 5,743,021 | A * | 4/1998 | Corcoran | G01B 3/1005 33/762 |
| 5,894,678 | A * | 4/1999 | Masreliez | G01D 5/2046 33/762 |
| 6,868,620 | B2 * | 3/2005 | Sanoner | G01B 3/11 33/763 |
| 9,903,696 | B2 * | 2/2018 | Stewart | G01B 3/1084 |
| 10,803,271 | B2 * | 10/2020 | Fuji | G01D 5/34715 |
| 10,859,363 | B2 * | 12/2020 | Murray | G01B 3/1084 |
| 2004/0040170 | A1 * | 3/2004 | Sanoner | G01B 3/11 33/762 |
| 2005/0068520 | A1 * | 3/2005 | Beimers | G01J 3/524 356/72 |
| 2014/0250708 | A1 * | 9/2014 | Bauer | G01B 3/1061 33/760 |
| 2016/0040971 | A1 * | 2/2016 | Hoge | G01B 3/1084 33/701 |
| 2017/0322007 | A1 * | 11/2017 | Stewart | G01B 3/1084 |
| 2019/0094001 | A1 * | 3/2019 | Murray | G01B 3/1084 |
| 2019/0156089 | A1 * | 5/2019 | Fuji | G01D 5/34792 |
| 2019/0370515 | A1 * | 12/2019 | Fuji | G01D 5/34792 |
| 2020/0208954 | A1 * | 7/2020 | Koike | G01B 3/1043 |
| 2021/0049335 | A1 * | 2/2021 | Fuji | G06K 7/12 |
| 2021/0180934 | A1 * | 6/2021 | Ishibashi | G01B 3/004 |
| 2021/0216837 | A1 * | 7/2021 | Yoshimatsu | G06K 7/1404 |

FOREIGN PATENT DOCUMENTS

| | | | | |
|---|---|---|---|---|
| CN | 106556296 | | 4/2017 | |
| JP | 61-230012 | | 10/1986 | |
| JP | 62-128302 | | 8/1987 | |
| JP | 2-5009 | | 1/1990 | |
| JP | 3143409 | | 7/2008 | |
| KR | 10-2016-0111074 | | 9/2016 | |
| KR | 10-1748628 | | 6/2017 | |
| KR | 1020170126258 | | 11/2017 | |
| WO | WO-2018104994 | A1 * | 6/2018 | ............ G01B 3/10 |
| WO | WO2018104994 | A1 | 6/2018 | |

OTHER PUBLICATIONS

Office Action, dated May 7, 2021, in corresponding Chinese Patent Application No. 201911218236.1 (17 pp.).

Notification of Reason for Refusal, dated Jun. 17, 2021, in corresponding Korean Patent Application No. 10-2019-0146552 (8 pp.).

* cited by examiner

FIG. 6

| 50a | SUM OF 50 | 52a | 52b | 52c | 52d | CORRECTION VALUE TO BE ADDED |
|---|---|---|---|---|---|---|
| 2 | ODD | 0 | 1 | 1 | 0 | −P3 |
| 2 | ODD | 1 | 2 | 1 | 0 | 0 |
| 2 | ODD | 1 | 2 | 0 | 0 | +P3 |
| 1 | ODD | 1 | 2 | 0 | 0 | −P3 |
| 1 | ODD | 2 | 2 | 0 | 0 | 0 |
| 1 | ODD | 2 | 2 | 0 | 1 | +P3 |
| 0 | ODD | 2 | 2 | 0 | 1 | −P3 |
| 0 | ODD | 2 | 1 | 0 | 1 | 0 |
| 0 | ODD | 2 | 1 | 1 | 2 | +P3 |
| 0 | EVEN | 2 | 1 | 1 | 2 | −P3 |
| 0 | EVEN | 1 | 0 | 1 | 2 | 0 |
| 0 | EVEN | 1 | 0 | 2 | 2 | +P3 |
| 1 | EVEN | 1 | 0 | 2 | 2 | −P3 |
| 1 | EVEN | 0 | 0 | 2 | 2 | 0 |
| 1 | EVEN | 0 | 0 | 2 | 1 | +P3 |
| 2 | EVEN | 0 | 0 | 2 | 1 | −P3 |
| 2 | EVEN | 0 | 1 | 2 | 1 | 0 |
| 2 | EVEN | 0 | 1 | 1 | 0 | +P3 |

MEASURING INSTRUMENT

CROSS-REFERENCE TO RELATED APPLICATION

This application is based upon and claims the benefit of priority of the prior Japanese Patent Application No. 2018-243654 filed on Dec. 26, 2018, the entire contents of which are incorporated herein by reference.

FIELD

A certain aspect of the embodiments is related to a measuring instrument.

BACKGROUND

There has been known a measuring instrument that measures a length of an object (e.g. see Japanese Laid-open Patent Publication No. 61-230012, and Japanese Unexamined Utility Model Application Publication Nos. 62-128302 and 2-5009). In the measuring instrument, patterns are formed on one surface of a measure, and the patterns are read with readers.

SUMMARY

According to a first aspect of the present disclosure, there is provided a measuring instrument that reads a measure including a plurality of reading patterns arranged in a length direction of the measure, each reading pattern including a plurality of patterns arranged in a width direction of the measure, including: a flattening member that increases a flatness of the measure; and a first reader that optically reads the plurality of patterns arranged in the width direction included in a single reading pattern from the measure in a state where the flatness is increased by the flattening member.

According to a second aspect of the present disclosure, there is provided a measuring instrument that reads a measure including a plurality of patterns arranged in a width direction of the measure, including: a first reader that optically reads the plurality of patterns; and a corrector that corrects signals read by the first reader so as to compensate for a difference between a plurality of distances between the measure and the first reader at positions where the plurality of patterns are provided.

According to a third aspect of the present disclosure, there is provided a measuring instrument that reads a measure including a plurality of reading patterns arranged in a length direction of the measure, each reading pattern including a plurality of patterns arranged in a width direction of the measure, including: a first reader that optically reads the plurality of patterns arranged in the width direction; a second reader that optically reads a plurality of patterns arranged in the length direction; and a corrector that corrects a length obtained from a reading result of the first reader, based on a reading result of the second reader.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating a table;

DESCRIPTION OF EMBODIMENTS

For example, in a measuring instrument used at a construction site, it is possible to ensure the flexibility and uprightness of a metal measure by curving the cross section of the metal measure. However, the curvature of the measure reduces an optical reading accuracy of the patterns by the reader. Also when the measure to be optically read is twisted, the reading accuracy of the patterns by the reader may be reduced.

An object of the embodiments is to provide a measuring instrument that can improve a measurement accuracy.

Hereinafter, a description will be given of the present embodiment of the present invention with reference to the drawings.

Figure 1:
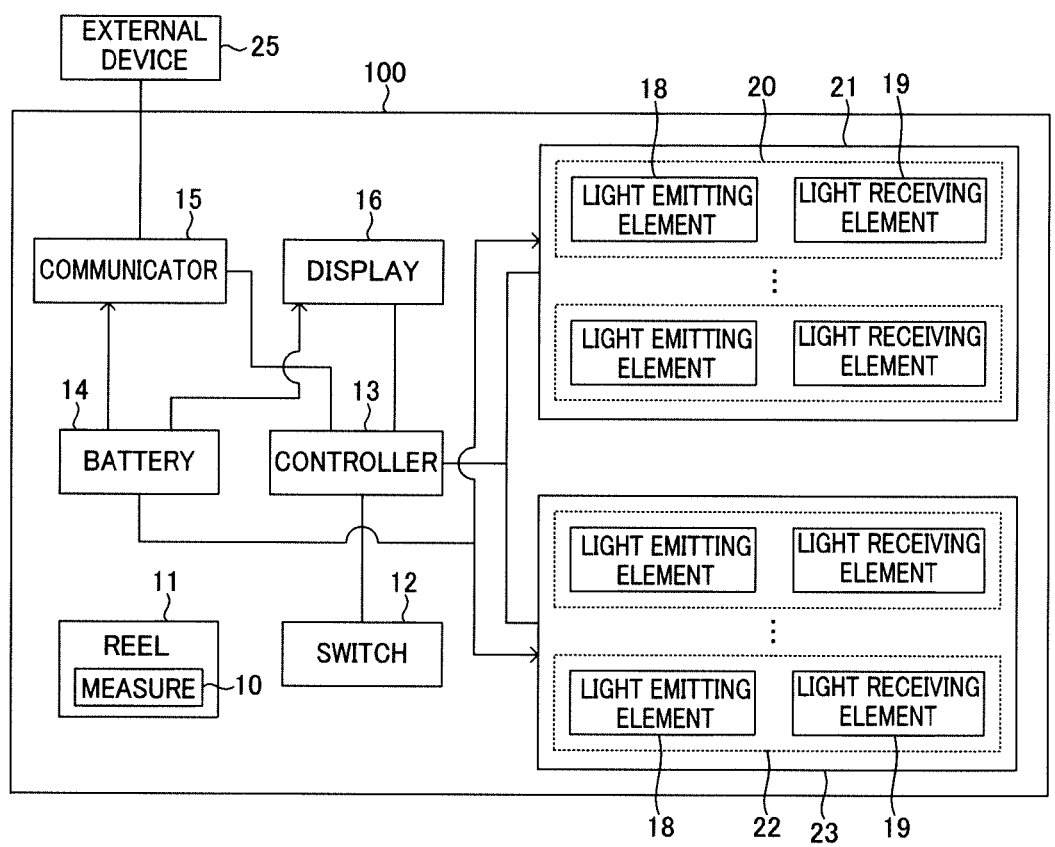
FIG. 1 is a block diagram illustrating a measuring instrument according to a first embodiment.

FIG. 1 is a block diagram illustrating a measuring instrument according to a first embodiment. A measuring instrument 100 includes a measure 10, a reel 11, a switch 12, a controller 13, a battery 14, a communicator 15, a display 16, and reading units 21 and 23. In the first embodiment, the measure 10 is wound around the reel 11. The reading unit 21 includes a plurality of readers 20, and the reading unit 23 includes a plurality of readers 22. In an example of FIG. 1, each of the readers 20 and 22 is an optical sensor including a light emitting element 18 and a light receiving element 19. The light emitting element 18 is, for example, a light emitting diode (LED), and irradiates a surface of the measure 10 with visible light, infrared light, ultraviolet light, or the like. The light receiving element 19 is a phototransistor, for example, and detects light reflected from the surface of the measure 10.

The switch 12 starts the controller 13 according to an operation. The controller 13 is a processor such as a central processing unit (CPU), for example, controls on and off of the light emitting element 18, reads a current value or a voltage value of a signal output from the light receiving element 19, and calculates a measurement value based on the reading result. The communicator 15 transmits the measurement value calculated by the controller 13 to an external device 25. For communication with the external device 25, wireless communication or wired communication is used. The display 16 is, for example, a liquid crystal display, and displays the measurement value calculated by the controller 13. The battery 14 supplies an electrical power to the controller 13, the communicator 15, the display 16, and the reading units 21 and 23.

The external device 25 is a computer or a smart phone, for example, and receives the measurement value indicating the length of a measurement object from the communicator 15 to register and manage the measurement value in a database, for example. The database registering the measurement value may be built in the external device 25, or may be provided outside the external device 25 in an accessible state.

Figure 2A:
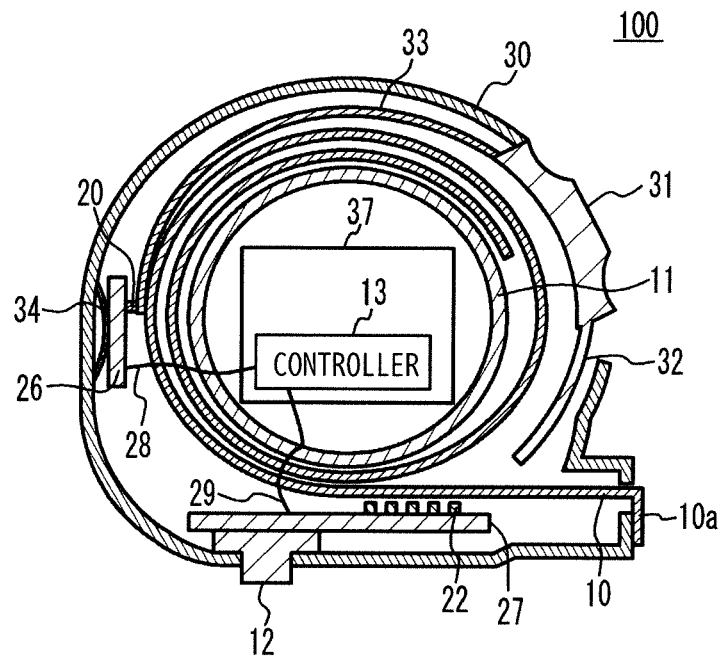
FIGS. 2A and 2B are cross-section diagrams illustrating the measuring instrument.
Figure 2B:
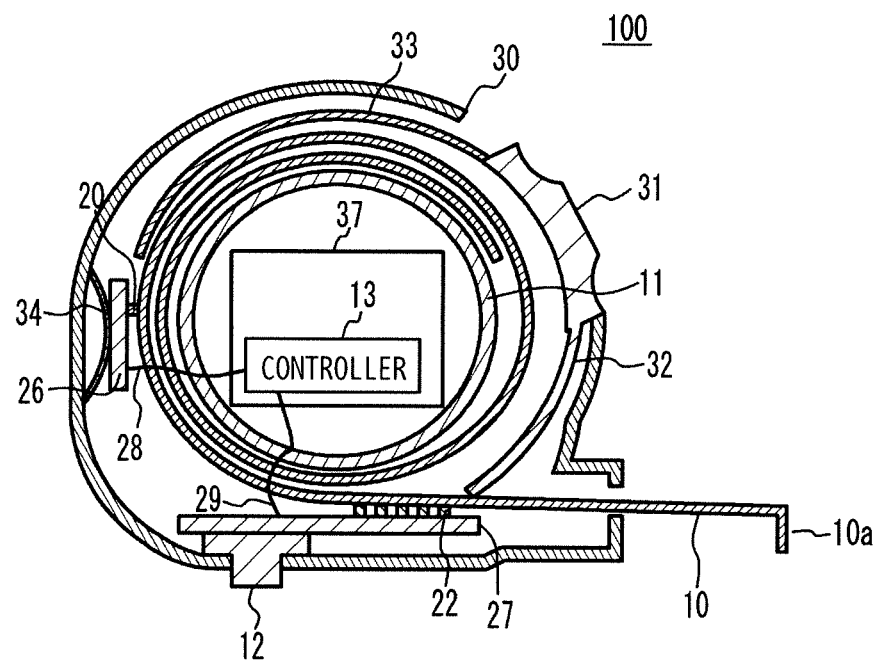

FIGS. 2A and 2B are cross-section diagrams illustrating the measuring instrument 100. As illustrated in FIG. 2A, the measuring instrument 100 includes a case 30, and the reel 11 is stored in the case 30. The measure 10 is wound around the reel 11. The reel 11 is biased by an elastic body such as a spring so as to wind the measure 10. A hook 10a which prevents the measure 10 from being pulled into the case 30 is provided at the tip of the measure 10.

In the first embodiment, substrates 26 and 27 are provided in the case 30. The readers 20 are provided on the substrate 26, and the readers 22 and the switch 12 are provided on the substrate 27. The substrates 26 and 27 are connected to a main substrate 37 via connection lines 28 and 29, respectively. The controller 13 is provided on the main substrate 37. The connection lines 28 and 29 transmit signals between the readers 20 and 22 and the controller 13, respectively. The substrate 26 is biased toward a right side of FIG. 2, i.e., toward the measure 10 by an elastic body such as a spring 34. Curved rod-like or plate-like pressing portions 32 and 33 are connected to a lock lever 31 to be operated when unlocking the measure 10. When the lock lever 31 is in an unlocked state as illustrated in FIG. 2A, the pressing portion 32 is separated from the measure 10, and the measure 10 is wound around the reel 11 by a biasing force of the spring. Further, in the unlocked state, the pressing portion 33 is inserted between the measure 10 and the substrate 26 or readers 20. For this reason, the readers 20 are separated from the surface of the measure 10.

As illustrated in FIG. 2B, the user extends the measure 10 and arranges the measure 10 near the measurement object. In FIG. 2B, the lock lever 31 is in a locked state. When the user locks the lock lever 31, the pressing portion 32 presses the measure 10 toward the substrate 27. Thereby, the measure 10 is locked, the measure 10 is prevented from being wound around the reel 11, and the measure 10 pressed by the pressing portion 32 is in contact with the readers 22. On the other hand, when the lock lever 31 is in the locked state, the pressing portion 33 is deviated from a position between the measure 10 and the substrate 26. Thereby, the readers 20 biased by the spring 34 are in contact with the measure 10.

The readers 20 and 22 may be covered with a transparent cover, and the cover may be in contact with the measure 10.

Figure 3:
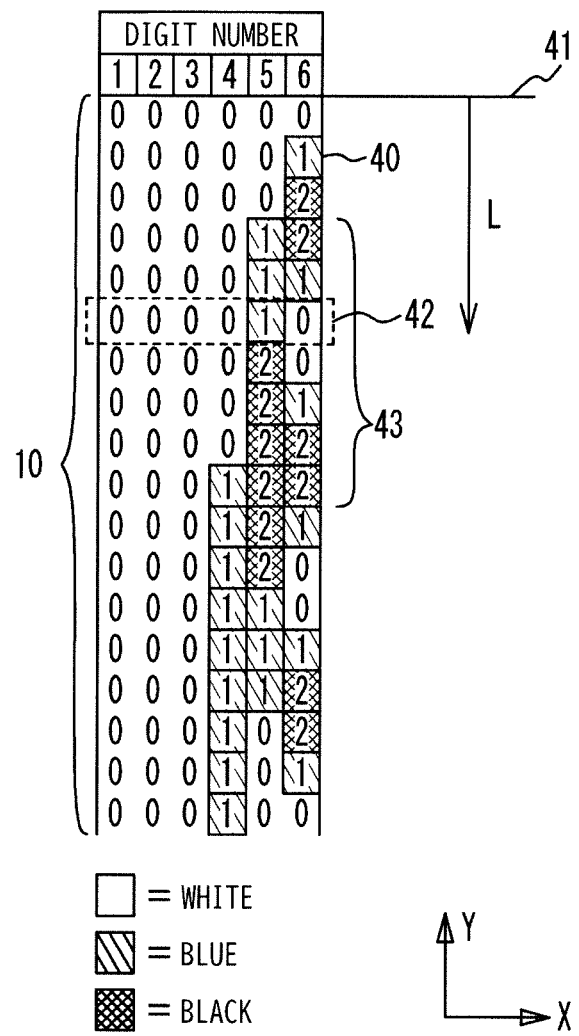
FIG. 3 is a diagram illustrating an example of patterns provided on a measure.

Next, a description will be given of an example of a color pattern printed on the measure 10. FIG. 3 is a diagram illustrating the example of the color pattern provided on the measure 10. It is assumed that a length direction of the measure 10 is a Y direction, and a width direction is an X direction. As illustrated in FIG. 3, a color pattern of a 6-digit ternary gray code including a plurality of patterns 40 arranged in the X direction is printed on one surface of the measure 10 for every certain length in the Y direction. The color pattern in one line is associated with a specific measurement value. The respective patterns 40 constituting the color pattern are separated by color. In FIG. 3, three colors of white, blue and black are used as colors corresponding to ternary numbers 0, 1 and 2. The colors corresponding to 0, 1, and 2 may be white, gray and black other than the above. The patterns may be printed with different densities or different reflectivities of the same color as long as the readers 20 and 22 can identify a plurality of densities as different colors. Here, a difference between the densities of the same color are also regarded as "different color". Although ternary values and digit numbers are shown in FIG. 3, the ternary values and the digit numbers need not be shown actually on the measure 10. On the other surface of the measure 10, a scale and a value indicating the length are printed as similar to a general measure. In FIG. 3, the color patterns are configured so that only a value in one digit is changed between the color patterns adjacent in the Y direction, and the other values in other digits are not changed. The color patterns are arranged so that the change of two or more values does not occur even in the digit where the value changes. That is, the change of the value from "0" to "2" or from "2" to "0" does not occur. For this reason, the ternary values corresponding to the color patterns in respective lines are not arranged in an ascending or descending order. The code constituting the color pattern may be a binary number or an N-ary number (N≥4) in addition to a ternary number.

Figure 4:
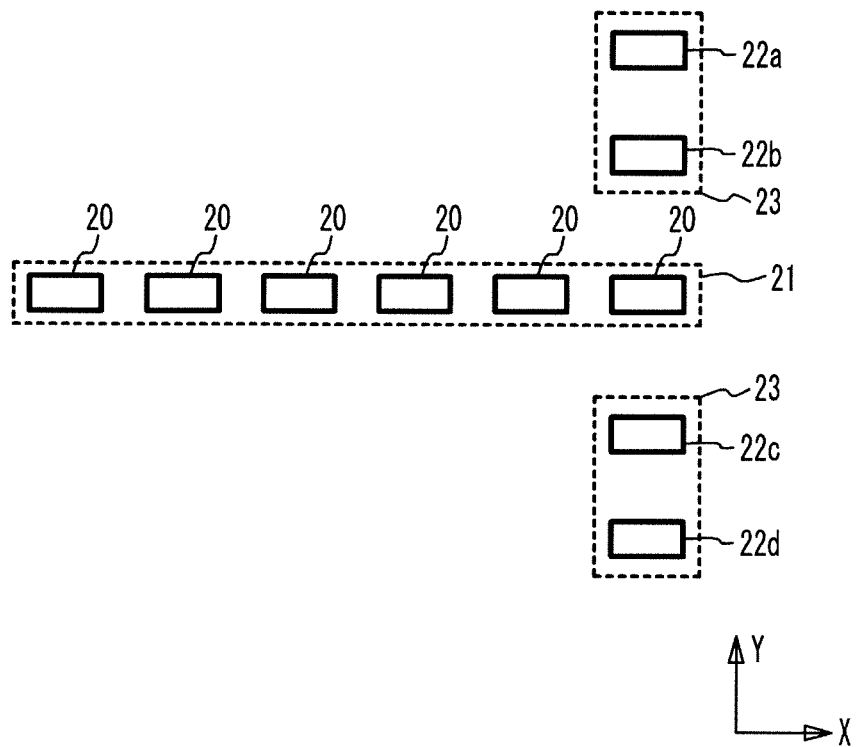
FIG. 4 is a diagram illustrating the arrangement of readers.

FIG. 4 is a diagram illustrating the arrangement of the readers 20 and 22. Six readers 20 are arranged in the X direction as the reading unit 21. The readers 20 are provided so as to correspond to the individual patterns 40 constituting the color pattern in the same line. Further, four readers 22a to 22d are arranged in the Y direction as the reading unit 23. As illustrated in FIGS. 2A and 2B, the reading units 21 and 23 may be provided apart from each other, but in the example of FIG. 4, the reading units 21 and 23 are illustrated close to each other for simplification of the explanation.

The readers 20 and 22 detect the colors of the patterns 40 of the respective digits in FIG. 3. The light emitting element 18 of each of the readers 20 and 22 irradiates the corresponding pattern 40 with light. The reflectivity of the pattern 40 decreases in order of white, blue and black. When the light receiving element 19 is irradiated with the reflected light from the pattern 40, the light receiving element 19 outputs any one of signals with, for example, 2.0V, 1.5V, and 1.0V corresponding to the color of the pattern 40.

When the pattern 40 of each digit in a region 42 in FIG. 3 is read, the controller 13 converts the output of the respective readers 20 into a ternary number "000010". When the ternary number "000010" is converted into the decimal number, a length L from a tip position 41 to the region 42 can be calculated. The length L can also be calculated from the obtained ternary value by using a table or the like, and the conversion from ternary value to the decimal value is not always necessary.

Figure 5A:
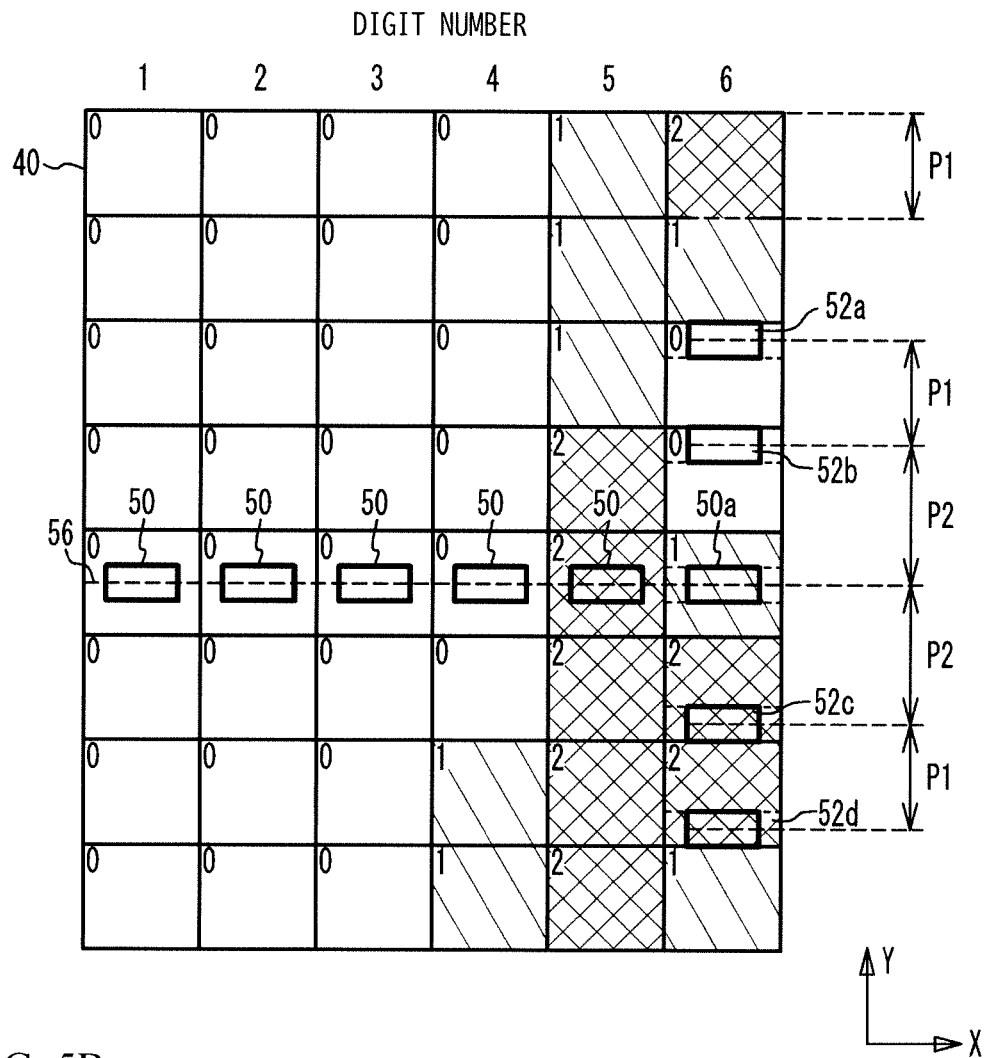
FIG. 5A is an enlarged diagram illustrating the patterns.
Figure 5B:
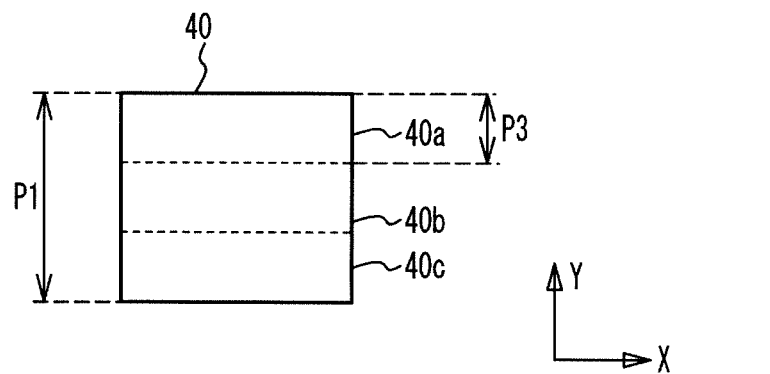
FIG. 5B is an enlarged diagram illustrating a single pattern.

FIG. 5A is an enlarged diagram illustrating the patterns printed on the measure 10. FIG. 5B is an enlarged diagram illustrating the single pattern. In FIG. 5A, a region 43 of FIG. 3 is enlarged, and the ternary value corresponding to the color of each pattern 40 is illustrated at the upper left of each pattern 40. The ternary value need not be shown in the measure 10. The ternary values "0", "1", and "2" correspond to the colors "white", "blue", and "black", respectively.

As illustrated in FIG. 5A, a width of each pattern 40 in the Y direction is P1, for example, 3 mm. The widths P1 of all the patterns 40 are substantially the same as each other within an error range of about a manufacturing error. Ranges 50 and 50a in FIG. 5A are ranges of the pattern 40 which the readers 20 in FIG. 4 read, respectively. Ranges 52a to 52d are ranges of the patterns 40 which the readers 22a to 22d in FIG. 4 read, respectively. The ranges 50 and 50a are located on a straight line extending in the X direction. The position of the straight line where the ranges 50 and 50a are arranged is a measurement position 56 where the patterns 40 are read. In FIG. 5A, the measurement position 56 is located at the center of the pattern 40 in the Y direction, and is a reference position for pattern reading. The controller 13 calculates the length L from the tip position 41 of the measure 10 to the measurement position 56 based on the reading results by the readers 20 in the ranges 50 and 50a. It should be noted that an actual measurement length is a value obtained by adding or subtracting a predetermined value to/from the length L.

When the patterns 40 in the ranges 50 and 50a are read using the readers 20 to measure the length, the measurement accuracy of one line of the color pattern is a height P1 of the pattern 40.

In FIG. 5B, the pattern 40 of a least significant digit (i.e., digit number 6) is virtually divided into three regions 40a, 40b and 40c in the Y direction. The regions 40a to 40c are not distinguished by printing, and cannot be distinguished on the measure 10 by visual inspection. The width of each of the regions 40a to 40c in the Y direction is P3. The P3 is equal to P1/3, for example, 1 mm. The widths of the regions 40a to 40c in the Y direction are substantially the same as each other, and fall within the range of the manufacturing error.

As illustrated in FIG. 5A, the ranges 52a to 52d correspond to the patterns of the least significant digit of respective lines, and are located on a straight line extending in the Y direction. A distance between the centers of the ranges 50a and 52b, and a distance between the centers of the ranges 50a and 52c are P2. The distance P2 is a sum of the width P1 and the width P3, for example 4 mm. A distance between the centers of the ranges 52a and 52b, and a distance between the centers of the ranges 52c and 52d are P1.

In addition to the readers 20, when the patterns 40 located in the ranges 52a to 52d are read using the readers 22a to 22d to measure the length, the measurement accuracy of the length can be set to P3.

FIG. 6 is a diagram illustrating a table. The controller 13 corrects the length L calculated from the output of the readers 20, using the table of FIG. 6. Thereby, the measurement accuracy can be set to P3.

The table of FIG. 6 includes a color read in the range 50a (i.e., the ternary value), a sum of the values read in the ranges 50, a combination of the colors read in the ranges 52a to 52d, and a correction value to be added to the length L calculated based on the output of the readers 20. The sum of the values of the ranges 50 indicates whether the sum of the values corresponding to five patterns 40 other than the pattern of the least significant digit is odd or even. The correction value is a value to be add to the length L determined by the colors of the patterns read in the ranges 50 and 50a. The correction value "−P3" indicates reducing a length corresponding to P3 from the length L determined by the reading result of the ranges 50 and 50a. The correction value "+P3" indicates adding the length corresponding to P3 to the length L determined by the reading result of the ranges 50 and 50a.

As described above, the controller 13 determines the length of the measurement object by using the measurement results of the readers 20 and 22a to 22d. Therefore, the measurement accuracy of the length can be improved compared with the width P1 of the pattern, without increasing the number of digits of the color pattern 40. By further increasing the number of readers 22a to 22d, the measurement accuracy can be made smaller than ⅓ of P1.

Figure 7A:
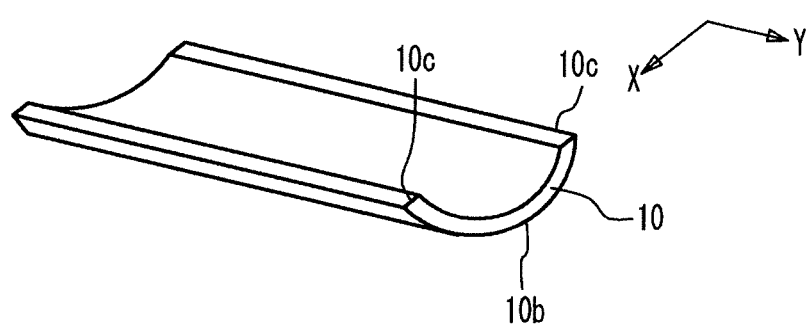
FIGS. 7A and 7B are perspective views illustrating the measure.
Figure 7B:
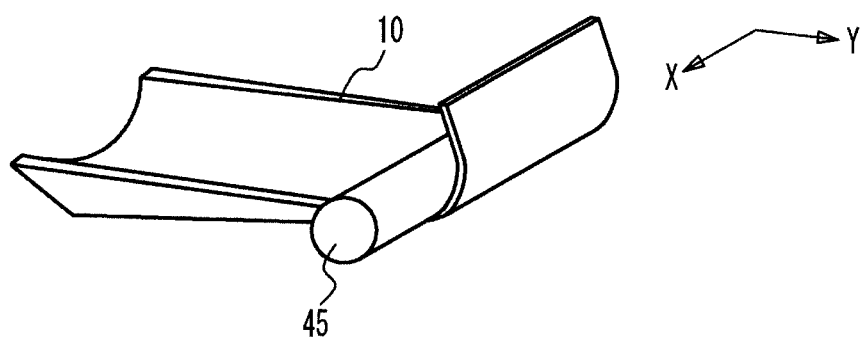

FIGS. 7A and 7B are perspective views illustrating the measure 10. The measure 10 of the present embodiment is made of metal, for example. In a state where no force is applied to the measure 10, the measure 10 is curved along the X direction as illustrated in FIG. 7A. In FIG. 7A, a center 10b of the measure 10 in the X direction is curved so as to protrude downward from ends 10c of the measure 10. The patterns 40 are printed on a convex surface of the measure 10 corresponding to a lower surface of the measure 10 in FIG. 7A. The scale that the user visually recognizes may be printed on the other surface of the measure 10. When an object 45 is hit against the measure 10 as illustrated in FIG. 7B and a force is applied in the thickness direction of the measure 10 or the measure 10 is bent so as to be wound, the measure 10 can be flattened. Since the uprightness of the measure 10 is high in a curved state, the measure 10 is hard to fold even when being extended. On the other hand, when a force is applied in the thickness direction of the measure 10, the curvature of the measure 10 is eliminated and the measure 10 deforms flexibly. Such a measure 10 is used, for example, at construction sites.

Figure 8A:
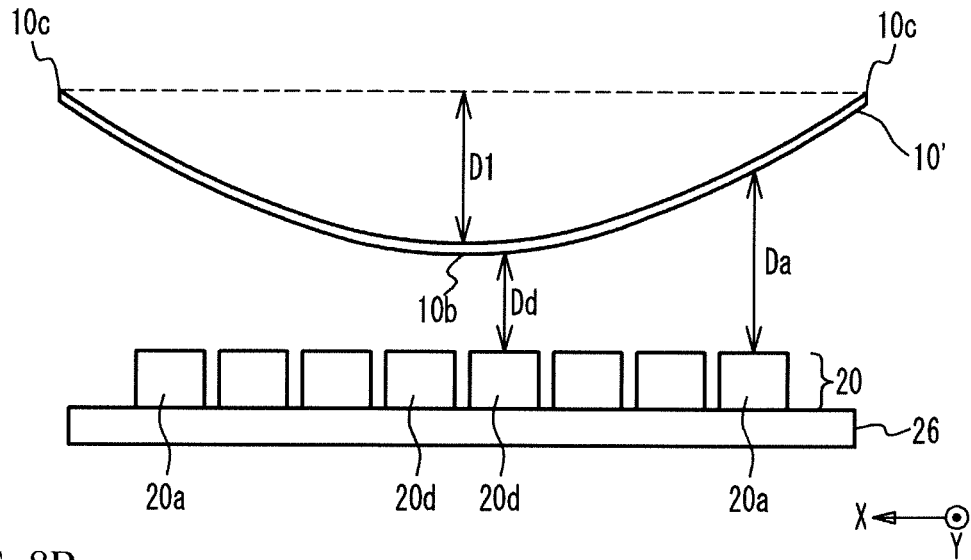
FIG. 8A is a cross-section diagram illustrating the measure and the readers according to a first comparative example.
Figure 8B:
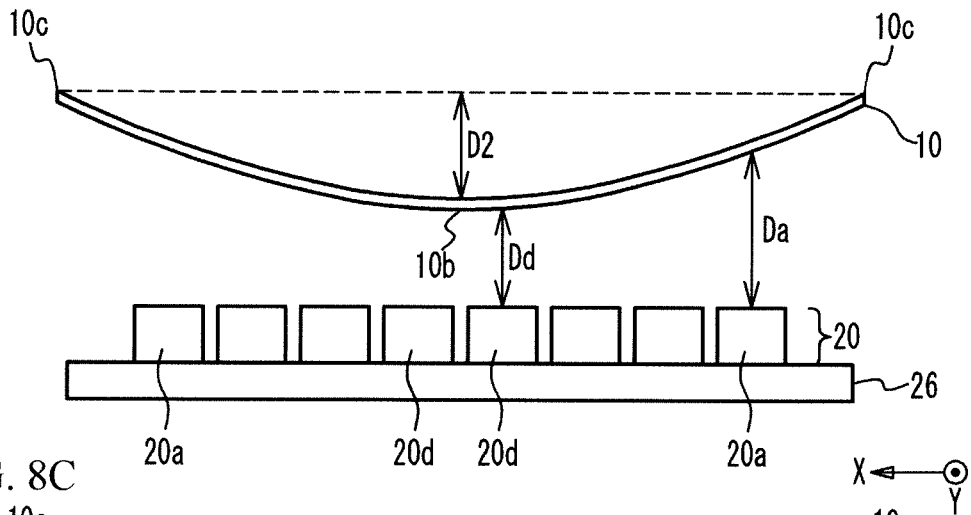
FIGS. 8B and 8C are cross-section diagrams illustrating the measure and the readers according to the first embodiment.
Figure 8C:
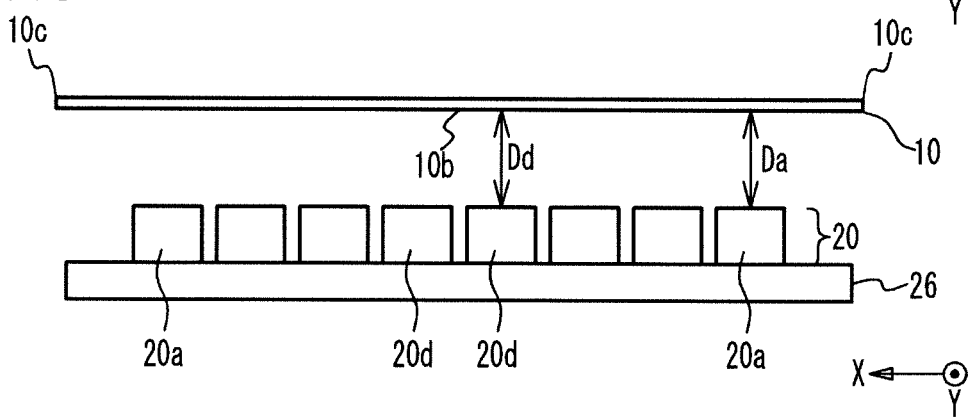

FIG. 8A is a cross-section diagram illustrating the measure and the readers according to a first comparative example. FIGS. 8B and 8C are cross-section diagrams illustrating the measure and the readers according to the first embodiment. A measure 10' illustrated in FIG. 8A is curved so that a center 10b in the X direction protrudes toward the readers 20 compared with ends 10c. FIG. 8A illustrates a state in which no force is applied to the measure 10', that is, a free state. A distance in a thickness direction between the center 10b and the ends 10c of the measure 10' is D1. Therefore, a distance Dd between the measure 10' and a reader 20d near the center 10b is different from a distance Da between the measure 10' and a reader 20a near the end 10c. Since the distances between the measure 10' and the readers 20a and 20d differ from each other, the amounts of reflected light from the measure 10' received by the readers 20a and 20d also differ. For this reason, even when the readers 20a and 20d read the same color, the current values or the voltage values of the output signals are different from each other, so that the measuring instrument may misunderstand that the readers 20a and 20d read different colors. Therefore, the measurement accuracy of the length may be reduced.

On the contrary, a degree of curvature of the measure 10 in FIG. 8B is smaller than that of the measure 10' in FIG. 8A, and a flatness of the measure 10 in FIG. 8B is higher than that of the measure 10' in FIG. 8A. A distance D2 in the thickness direction between the center 10b and the ends 10c of the measure 10 is smaller than the distance D1 in a free state. Thereby, a difference between the distance Da near the ends of the measure 10 and the distance Dd near the center of the measure 10 becomes smaller than that in FIG. 8A. Since the difference between the current values or voltage values of the output signals from the readers 20a and 20d when the same color is read becomes small, and the current values or voltage values fall within a predetermined range, the measurement accuracy of the length can be improved.

On the other hand, when the measure 10 is substantially flat in the X direction as illustrated in FIG. 8C, the distances Da and Dd can be made substantially the same. In this case, when the same colors are read, there is almost no difference between the current values or voltage values of the output signals from the readers 20a and 20d, and therefore the measurement accuracy of the length can be further improved compared with the case of FIG. 8B.

Figure 9:
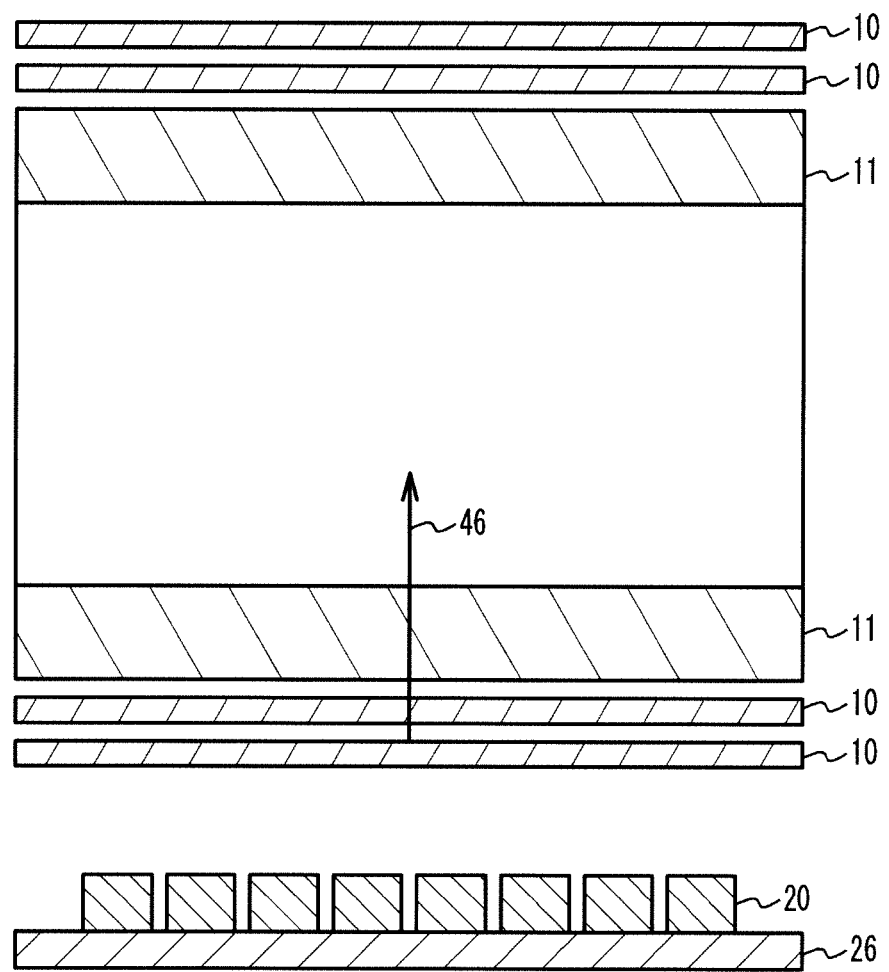
FIG. 9 is a cross-section diagram illustrating a reel and the measure.

FIG. 9 is a cross-section diagram illustrating the reel 11 and the measure 10. When the measure is wound around the reel 11 as illustrated in FIG. 9, a force is applied to the measure 10 in the center direction of the reel 11 as indicated by an arrow 46. Thereby, the measure 10 is substantially flat in the width direction. In this case, it is considered that the reel 11 may function as a flattening member. In the first embodiment, the readers 20 are arranged toward the reel 11, and the readers 20 read the colors of the patterns 40 while the measure 10 is wound around the reel 11. Therefore, there is almost no difference between the current values or the voltage values of the output signals from the readers 20 when the same colors are read. Thereby, the measurement accuracy of the length can be improved. When the lock lever 31 in FIG. 2B is in the locked state, the pressing portion 33 is removed from the position between the measure 10 and the substrate 26, and the measure 10 is pressed toward the reel 11 by the readers 20 biased by the spring 34. Therefore, the measure 10 can be further kept flat. In this case, the readers 20 function as a flattening member and/or a pressing member.

Second Embodiment

Figure 10:
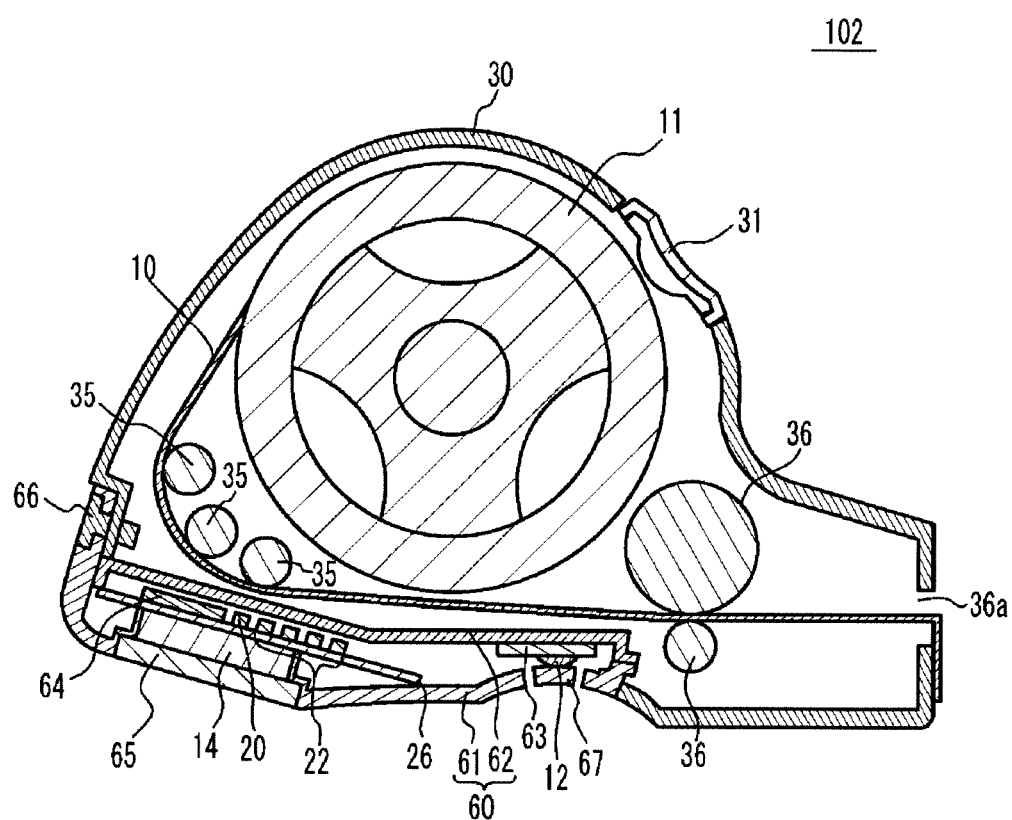
FIG. 10 is a cross-section diagram illustrating the measuring instrument according to a second embodiment.

FIG. 10 is a cross-section diagram illustrating the measuring instrument according to a second embodiment. In the measuring instrument 102 illustrated in FIG. 10, the readers 20 and 22 are provided on the same substrate 26. A plurality of rollers 35 are provided near the reader 20, and a plurality of rollers 36 are also provided near a hole 36a through which the measure 10 in the case 30 is pulled out. The substrate 26 including the readers 20 and 22 is provided in a case 60. The case 60 is fixed, with a screw 66, to the case 30 in which the measure 10 is stored.

Figure 11:
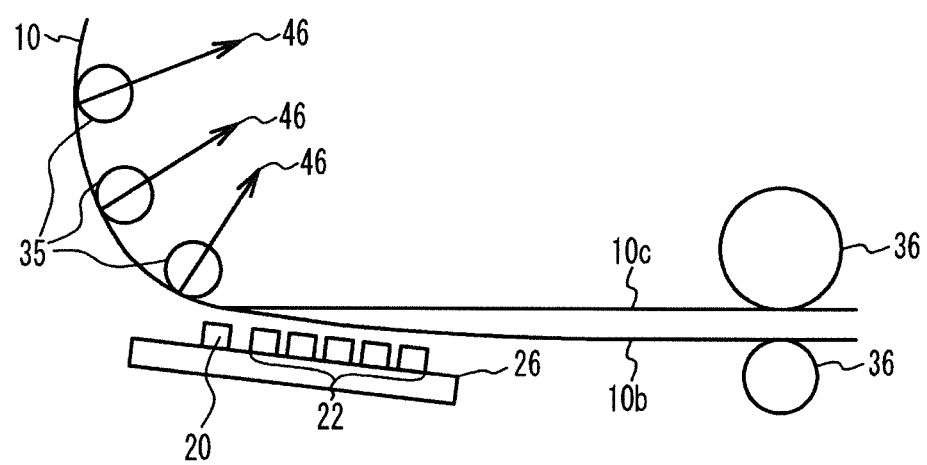
FIG. 11 is a schematic diagram illustrating the readers and the measure.

FIG. 11 is a schematic diagram illustrating the readers 20 and 22 and the measure 10. In FIG. 11, it is assumed that the measure 10 is curved so that the lower surface of the measure 10 protrudes downward in FIG. 11. When the measure 10 comes into contact with the rollers 35, forces are applied to the measure 10 in the direction of the arrows 46 at portions in contact with the rollers 35. Thereby, the measure 10 is pressed against the rollers 35 and becomes flat in the width direction, and the curvature of the measure 10 near the rollers 35 is almost removed. In this case, the rollers 35 may function as a flattening member and/or the pressing member. The readers 20 are provided at positions closer to the rollers 35. The rollers 36 guides the measure 10 to the hole 36a, and the rollers 36 apply almost no force to the measure 10. Thereby, in the vicinity of the hole 36a, the measure 10 is in a natural state, and the curvature of the measure 10 is large. However, since the readers 20 read the colors of the patterns 40 at a position where the curvature of the measure 10 is small and the flatness is high, the distances between the respective patterns 40 in the same line and the respective readers 20 can be kept substantially constant. Therefore, the reading accuracy of the patterns 40 is improved, and there is no influence of the curvature of the measure 10 in the vicinity of the hole 36a. On the other hand, since the readers 22 are arranged in the Y direction and read the patterns of the same digit arranged in the Y direction, it is expected that the distances between the respective readers 22 and the respective patterns to be read are substantially constant. For this reason, the reading of the patterns by the readers 22 is not easily affected by the curvature in the X direction. Therefore, the readers 22 are provided closer to the hole 36a than the readers 20.

Figure 12A:
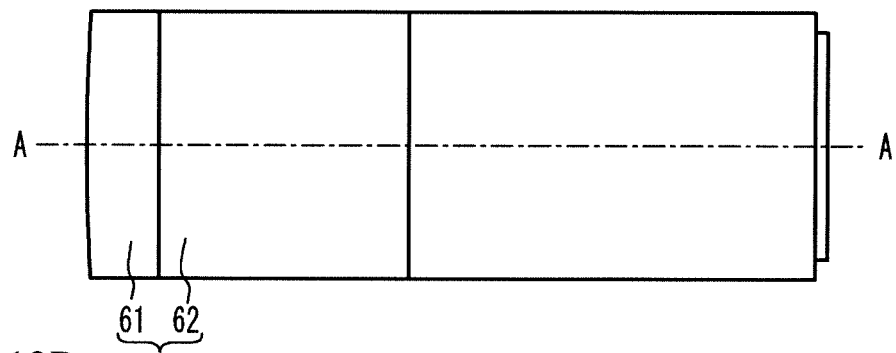
FIG. 12A is a top view of a case in the measuring instrument.
Figure 12B:
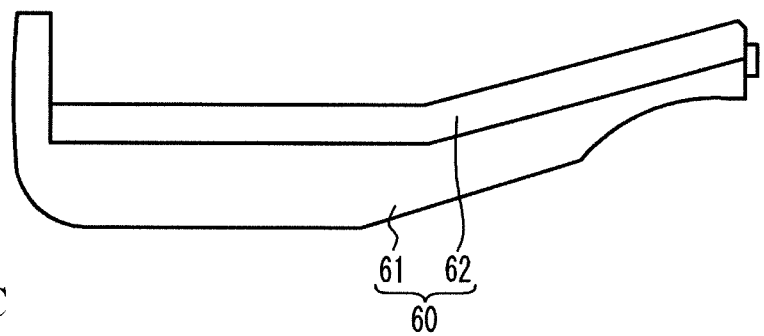
FIG. 12B is a side view of the case in the measuring instrument.
Figure 12C:
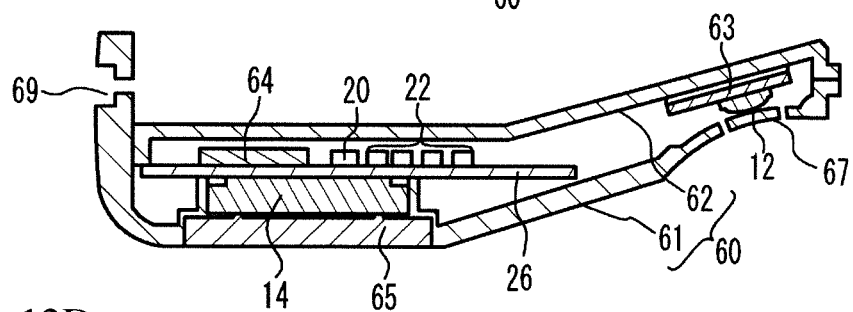
FIG. 12C is a cross-section view taken along a line A-A of FIG. 12A.
Figure 12D:
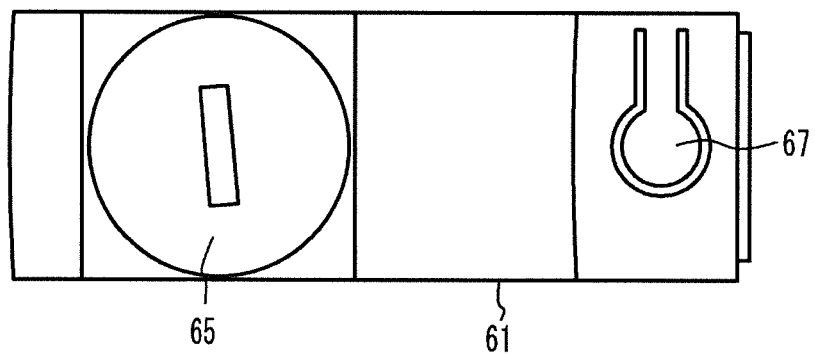
FIG. 12D is a bottom view of the case in the measuring instrument case.

FIG. 12A is a top view of the case 60 in the measuring instrument 102. FIG. 12B is a side view of the case 60. FIG. 12C is a cross-section view taken along a line A-A of FIG. 12A. FIG. 12D is a bottom view of the case 60. As illustrated in FIGS. 12A to 12D, the case 60 in which the readers 20 and 22 are stored includes a lower case 61 and an upper case 62. The lower case 61 and the upper case 62 are joined. The lower case 61 and the upper case 62 are, for example, a resin. The upper case 62 is transparent to transmit light (for example, infrared light) emitted from the readers 20 and 22.

The substrates 26 and 63 and the battery 14 are stored in the case 60. The readers 20 and 22 and an integrated circuit 64 are provided on the substrate 26. The integrated circuit 64 functions as, for example, the controller 13 and the communicator 15. The case 30 in which the measure 10 is stored is placed on the upper case 62. The light emitted from the readers 20 and 22 passes through the upper case 62, and is irradiated on the measure 10. The light reflected by the measure 10 passes through the upper case 62, and reaches the readers 20 and 22. The battery 14 is stored under the substrate 26, and a cover 65 for a storage area of the battery 14 is provided on a lower surface of the lower case 61. A switch 12 for turning on the measuring instrument 102 is provided under the substrate 63, and a pressing part 67 for pressing the switch 12 is provided on the lower surface of the lower case 61. The case 60 is provided with a hole 69 for the screw 66. The case 60 can be attached to and detached from the case 30. The case 60 may be attached to the case 30 using a locking part such as a hook in addition to screwing. Other configurations are the same as those of the first embodiment, and the description thereof is omitted.

In the construction sites, the measuring instrument is used in a harsh environment with much sands and dusts. For this reason, there is a possibility that the pattern cannot be read due to stain or wear of the surface of the measure 10. Further, there is a possibility that the measure 10 breaks, and the measuring instrument may be unusable within a few months. However, when the measuring instrument itself is replaced, the cost for the measuring instrument increases. On the other hand, in the second embodiment, the case 60 in which the readers 20 and 22 are stored can be attached and detached to/from the case 30 in which the measure 10 is stored. Thereby, the expensive readers 20 and 22 are reused, and the inexpensive measure 10 can be easily replaced. In addition to the readers 20 and 22, at least one of the controller 13, the communicator 15 and the display 16 may be provided in the case 60. Thereby, it is possible to replace only an inexpensive part in which the measure 10 is stored. Since the measure 10 can be considered as a consumable item, it is greatly advantageous to allow only the part related to the measure 10 to be replaced when using the measuring instrument.

According to the first and the second embodiments, the readers 20 (first readers) optically read the plurality of patterns 40 in the X direction of the measure 10 in a second state having a degree of curvature smaller than that of the first state in which no force is applied to the measure 10 and the measure 10 is curved in the width direction, as illustrated in FIGS. 8B and 8C. Thereby, the distance between the measure 10 and the readers 20 can be made more uniform, the reading accuracy of the patterns 40 is improved, and the measurement accuracy of the length is improved.

The readers 22 (second readers) optically read the plurality of patterns 40 arranged in the Y direction of the measure 10 in a third state where the curvature of the measure 10 is larger than that of the measure 10 in the second state. Since the readers 22 read the colors of the patterns of the same digit arranged in the Y direction, the distances between the measure 10 and the respective readers 22 are almost the same and the reading accuracy is hardly affected even when the measure 10 is curved in the X direction. Therefore, there is no problem even if the readers 22 read the colors of the patterns at positions where the curvature of the measure 10 is larger than that of the measure 10 in the second state. Further, the readers 22 may read the patterns 40 in any one of the first state, the second state, or a flat state.

Since the readers 22 are provided to improve the measurement accuracy, the readers 22 may not be necessarily provided.

In the first embodiment, the readers 20 read the patterns 40 of the measure 10 wound around the reel 11. Thereby, the readers 20 can read the patterns 40 in a state where the curvature of the measure 10 is small.

In the second embodiment, the measure 10 is pressed by the rollers 35 (a pressing member) so as to reduce the curvature of the measure 10. The readers 20 read the patterns 40 of the measure 10 in a state where the curvature is reduced by the rollers 35. Thereby, the readers 20 can read the patterns 40 in the state where the curvature of the measure 10 is small. The pressing member may be other member that presses the measure 10 other than the rollers 35.

In the second embodiment, the case 30 (a first case) for storing the measure 10 and the case 60 (a second case) for storing the readers 20 and 22 are detachable. Thereby, the expensive readers 20 and 22 are reused, and the inexpensive measure 10 can be easily replaced.

In the measuring instruments 100 and 102, the measurement value measured by the communicator 15 can be transmitted to the external device 25 by wireless or the like. Thereby, the measurement value can be stored in the database without recording the measured length by the user. As in the first embodiment, the measuring instrument 100 may include a display 16 that displays the measurement value. Thereby, the user can confirm the measurement value.

Third Embodiment

Figure 13:
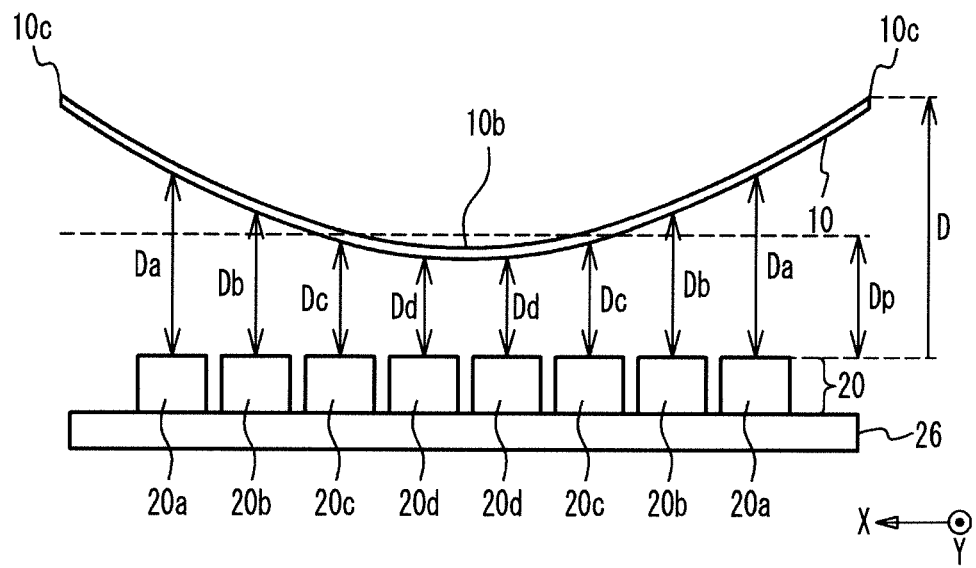
FIG. 13 is a cross-section diagram illustrating the measure and the readers according to a third embodiment.

FIG. 13 is a cross-section diagram illustrating the measure 10 and the readers 20a to 20d according to a third embodiment. In the third embodiment, the readers 20a to 20d read the patterns 40 in the state where the measure 10 is curved, as illustrated in FIG. 13. The measure 10 may be curved in a free state as illustrated in FIG. 8A, or may be in a state where the curvature is smaller than the curvature in the free state, as illustrated in FIG. 8B. The distances between the upper surfaces of the readers 20a to 20d and the lower surface of the measure 10 indicate values in a range from Da to Dd. The distance Dd near the center 10b of the measure 10 is minimum, the distance increases toward the ends of the measure 10, and the distance Da near the ends 10c of the measure 10 is maximum.

Figure 14:
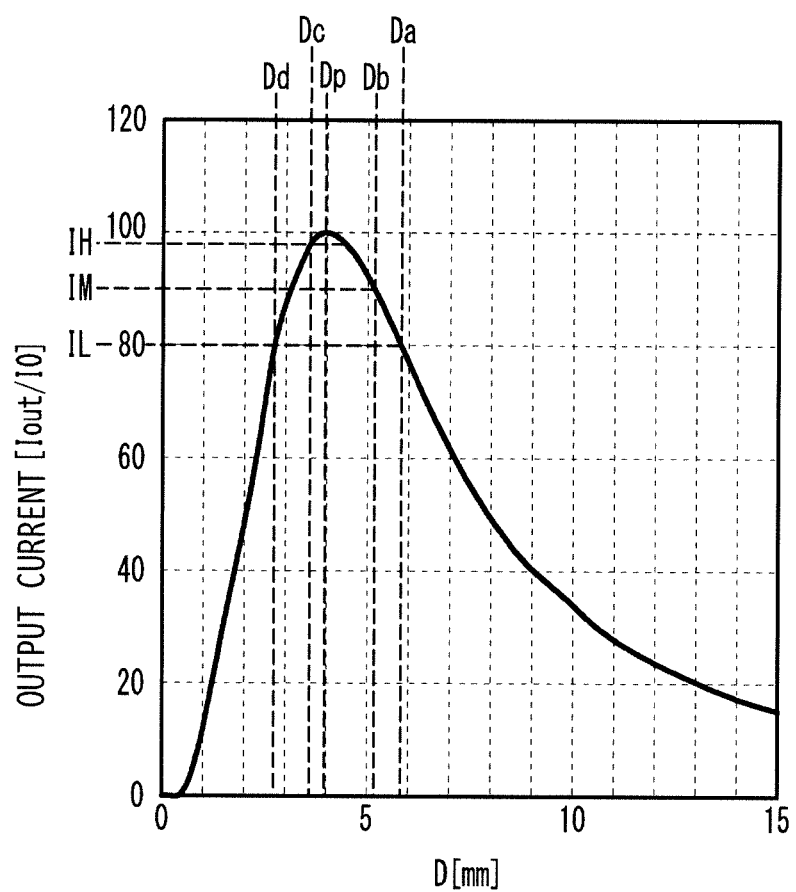
FIG. 14 is a diagram illustrating an output current of a reader with respect to a distance D.

FIG. 14 is a diagram illustrating an output current of each reader with respect to the distance D. A vertical axis represents an output current Iout of the measuring instrument normalized by a peak current I0 of the output current, and the value Iout/I0 is expressed in percent. It is assumed that the peak current I0 is output when the distance is a reference distance Dp, as illustrated in FIG. 14. As the distance D is smaller than or larger than the reference distance Dp, the output current gradually decreases. In FIG. 14, an output current IL at the distances Da and Dd is 80% of the peak current I0, an output current IM at the distance Db is 90% of the peak current I0, and an output current IH at the distance Dc is 98% of the peak current I0. Thus, even when the same color patterns are read, the outputs of the readers 20a and 20d are about 20% smaller than the output of the reader 20c, and it may be therefore determined that the readers 20a and 20d and the reader 20c read different colors. Therefore, in the third embodiment, the output of each reader is corrected according to the distance between the measure 10 and each reader 20.

Figure 15A:
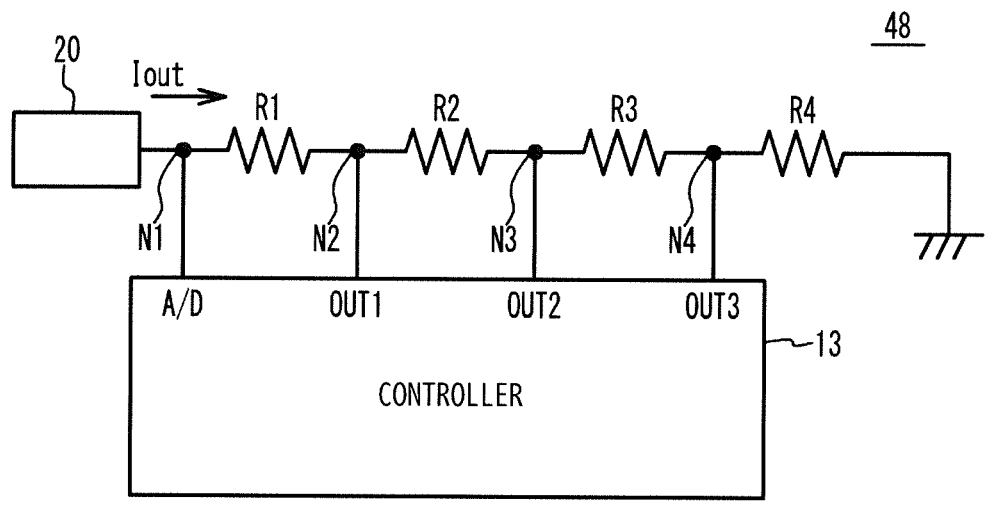
FIG. 15A is a block diagram illustrating a corrector.

FIG. 15A is a block diagram illustrating an example of a corrector 48. In the corrector 48 illustrated in FIG. 15A, resistors R1 to R4 are connected in series between an output terminal of the reader 20 and a ground. A node N1 between the resistor R1 and the reader 20 is connected to an analog/digital conversion terminal A/D of the controller 13. A node N2 between the resistors R1 and R2, a node N3 between the resistors R2 and R3, and a node N4 between the resistors R3 and R4 are connected to output terminals OUT1 to OUT3 of the controller 13, respectively.

The controller 13 adjusts potentials of the output terminals according to the readers 20a to 20d. When the output signals of the readers 20a and 20d are acquired, the controller 13 sets the output terminal OUT3 to a low level (for example, a ground voltage). In this case, a voltage VL of the node N1 is VL=IL×(R1+R2+R3). When the output signal of the reader 20b is acquired, the controller 13 sets the output terminal OUT2 to the low level. In this case, a voltage VM of the node N1 is VM=IM×(R1+R2). When the output signal of the reader 20c is acquired, the controller 13 sets the output terminal OUT1 to the low level. In this case, a voltage VH of the node N1 is VH=IH×R1. The resistance values of the resistors R1 to R4 are appropriately set according to the distance between each of the readers 20a to 20d and the measure 10, so that the voltages VL, VM and VH of the node N1 corresponding to the respective readers 20a, 20d, 20b, and 20c which read the same color can be set to substantially the same voltage value. Thereby, even when the curved measure 10 is read, the difference between the distances D between the measure 10 and the readers 20 can be compensated, and the reading accuracy can be improved.

Figure 15B:
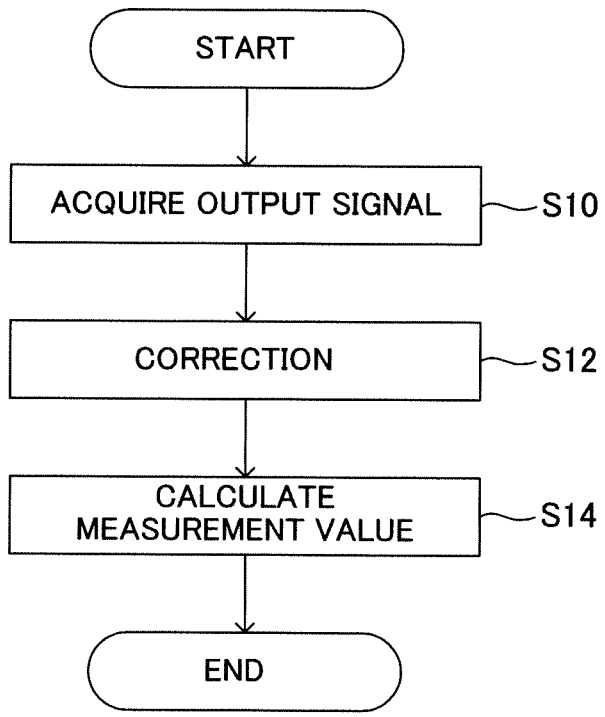
FIG. 15B is a flowchart illustrating processing to be executed by a controller.

FIG. 15B is a flowchart illustrating processing to be executed by the controller 13. As substitute for the circuit illustrated in FIG. 15A, a correction coefficient set beforehand for each reader can be used to correct the output signal of each reader. As illustrated in FIG. 15B, the controller 13 acquires the output signal from each reader 20 (S10). The controller 13 corrects the output signal of the reader 20 (S12). In an example of FIG. 15B, the output signal of each reader is multiplied by the correction coefficient of the corresponding reader. For example, the output signals of the readers 20a and 20d are multiplied by 1.2 as the correction coefficient. The output signal of the reader 20b is multiplied by 1.1 as the correction coefficient. The output signal of the reader 20c is multiplied by 1.02 as the correction coefficient. Thereby, the values obtained by multiplying the respective correction coefficient by the output signals of the readers 20a to 20d when the same patterns are read can be made substantially the same value. Therefore, the difference between the distances D between the measure 10 and the readers 20 can be compensated. The controller 13 calculates the measurement value based on the corrected output signal of each reader (S14). Then, the present processing is terminated.

The correction of the signals read by the readers 20a to 20d may be realized by the circuit as illustrated in FIG. 15A, or may be realized by the cooperation of software and hardware as illustrated in FIG. 15B. Other configurations are the same as those of the first and the second embodiments, and the description thereof is omitted.

According to the third embodiment, the corrector 48 corrects the signals read by the readers 20a to 20d so as to compensate for the difference between the distances Da to Dd between the readers 20a to 20d and the measure 10. Thereby, even when the measure 10 is curved, the reading accuracy of the patterns 40 is improved, and the measurement accuracy of the length is improved.

Since the readers 22 read the same digit of the patterns 40, the curvature of the measure 10 does not affect the outputs from the readers 22, and therefore the corrector 48 does not need to correct the signals read by the readers 22.

In the above embodiments, the description is given of the prevention of a decrease in the reading accuracy due to the curvature of the metal measure. However, the above embodiments can also be applied to the case of using a resin measure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A measuring instrument that reads a measure including a plurality of reading patterns arranged in a length direction of the measure, each reading pattern including a plurality of patterns arranged in a width direction of the measure, comprising:
   a flattening member that increases a flatness of the measure; and
   a plurality of first readers arranged in the width direction, that optically read the plurality of patterns arranged in the width direction included in a single reading pattern from the measure in a state where the flatness is increased by the flattening member.

2. The measuring instrument as claimed in claim 1, further comprising:
   a plurality of second readers arranged in the length direction, that optically read a plurality of patterns arranged in the length direction of the measure.

3. A measuring instrument that reads a measure including a plurality of reading patterns arranged in a length direction of the measure, each reading pattern including a plurality of patterns arranged in a width direction of the measure, comprising:
   a reel around which the measure is wound; and
   a first reader that optically reads the plurality of patterns arranged in the width direction included in a single reading pattern from the measure in a state where the measure is wound around the reel.

4. A measuring instrument that reads a measure including a plurality of reading patterns arranged in a length direction of the measure, each reading pattern including a plurality of patterns arranged in a width direction of the measure, comprising:
   a pressing member that presses the measure; and
   a first reader that optically reads the plurality of patterns arranged in the width direction included in a single reading pattern from the measure in a state where the pressing member presses the measure.

5. A measuring instrument that reads a measure including a plurality of reading patterns arranged in a length direction of the measure, each reading pattern including a plurality of patterns arranged in a width direction of the measure, comprising:
   a flattening member that increases a flatness of the measure;
   a first reader that optically reads the plurality of patterns arranged in the width direction included in a single reading pattern from the measure in a state where the flatness is increased by the flattening member;
   a first case that stores the measure; and
   a second case that stores the first reader and is detachable to the first case.

6. A measuring instrument that reads a measure including a plurality of patterns arranged in a width direction of the measure, comprising:
   a first reader that optically reads the plurality of patterns; and
   a corrector that corrects signals read by the first reader so as to compensate for a difference between a plurality of distances, in a direction where the measure and the first reader face each other, between the measure and the first reader at positions where the plurality of patterns are provided.

7. The measuring instrument as claimed in claim 6, further comprising:
   a first case that stores the measure; and
   a second case that stores the first reader and is detachable to the first case.

8. A measuring instrument that reads a measure including a plurality of reading patterns arranged in a length direction of the measure, each reading pattern including a plurality of patterns arranged in a width direction of the measure, comprising:
   a first reader that optically reads the plurality of patterns arranged in the width direction;
   a second reader that optically reads a plurality of patterns arranged in the length direction; and
   a corrector that corrects a length obtained from a reading result of the first reader, based on a reading result of the second reader.

9. The measuring instrument as claimed in claim 8, further comprising:
   a first case that stores the measure; and
   a second case that stores the first reader and is detachable to the first case.

* * * * *